United States Patent
Nishiyama et al.

(10) Patent No.: US 7,684,159 B2
(45) Date of Patent: Mar. 23, 2010

(54) MAGNETIC HEAD DEVICE PROVIDED WITH LEAD ELECTRODE ELECTRICALLY CONNECTED TO UPPER SHIELD LAYER AND LOWER SHIELD LAYER

(75) Inventors: Yoshihiro Nishiyama, Niigata-ken (JP); Daigo Aoki, Niigata-ken (JP); Toru Takahashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 596 days.

(21) Appl. No.: 11/567,645

(22) Filed: Dec. 6, 2006

(65) Prior Publication Data

US 2007/0127163 A1 Jun. 7, 2007

(30) Foreign Application Priority Data

Dec. 6, 2005 (JP) ............................. 2005-351738

(51) Int. Cl.
*G11B 5/39* (2006.01)
(52) U.S. Cl. ...................................... 360/319; 360/322
(58) Field of Classification Search ................. 360/319, 360/322, 324–324.2
See application file for complete search history.

(56) References Cited

U.S. PATENT DOCUMENTS

| | | | |
|---|---|---|---|
| 6,643,104 B2 * | 11/2003 | Shimazawa | 360/319 |
| 6,680,829 B2 * | 1/2004 | Chen et al. | 360/319 |
| 6,731,475 B2 * | 5/2004 | Ikeda | 360/322 |
| 6,999,270 B2 * | 2/2006 | Watanabe et al. | 360/78.04 |
| 2004/0264034 A1 * | 12/2004 | Watanabe et al. | 360/78.04 |
| 2007/0002502 A1 * | 1/2007 | Burbank et al. | 360/319 |

FOREIGN PATENT DOCUMENTS

| | | | |
|---|---|---|---|
| JP | 2001-307307 | | 11/2001 |
| JP | 2002-25016 | | 1/2002 |
| JP | 2002-25017 | | 1/2002 |
| JP | 2002-25018 | | 1/2002 |
| JP | 2004206790 A | * | 7/2004 |
| JP | 2005-018903 | | 1/2005 |
| JP | 2005-251342 | | 9/2005 |

OTHER PUBLICATIONS

English Translation of previously submitted Office Action is corresponding Japanese Patent Application 2005-351738; mailed May 27, 2008.

* cited by examiner

*Primary Examiner*—William J Klimowicz
(74) *Attorney, Agent, or Firm*—Brinks Hofer Gilson & Lione

(57) ABSTRACT

A lower shield layer and an upper shield layer are formed to have a planar shape, and a detecting element is provided between the lower shield layer and the upper shield layer. End faces of the upper shield layer may extend farther in a depthwise direction from a surface facing a recording medium than end faces of the lower shield layer. A lower conductive electrode may be disposed directly adjacent to a facing inner surface of the lower shield layer. An upper conductive electrode may be disposed adjacent to a portion of the upper shield layer. Therefore, the lower shield layer and the upper conductive electrode may be insulated from each other.

11 Claims, 4 Drawing Sheets

MAGNETIC HEAD DEVICE PROVIDED WITH LEAD ELECTRODE ELECTRICALLY CONNECTED TO UPPER SHIELD LAYER AND LOWER SHIELD LAYER

This application claims the benefit of Japanese Patent Application No. 2005-351738 filed Dec. 6, 2005, which is hereby incorporated by reference.

TECHNICAL FIELD

The present disclosure relates to a magnetic head device using a detecting element in which a current flows in a thicknesswise direction using a GMR effect or a tunnel effect. More particularly, the present disclosure relates to a magnetic head device in which a structure of a current path is simple and an insulating effect is improved.

BACKGROUND

Generally, for a magnetic head device using a detecting element that operates based on a GMR effect (giant magnetoresistance effect) or a tunnel effect, a sense current flows in a thicknesswise direction of the detecting element and the magnetic head is referred to as a current-perpendicular-to-the-plane (CPP)-type device.

The CPP-type magnetic head device includes a lower shield layer formed of a soft magnetic material on the bottom of a detecting element, and an upper shield layer formed of a soft magnetic material on the detecting element. A leakage magnetic flux from a magnetic recording medium in a middle region between both the lower shield layer and the upper shield layer is detected by the detecting element, so that magnetic information recorded on the magnetic recording medium may be read. To apply a current to the detecting element in a thicknesswise direction in this CPP-type magnetic head device, the detecting element may be electrically connected to the lower shield layer and the upper shield layer, and a current may be applied to the detecting element through the upper and lower shield layers.

However, according to the related art, a conductive layer (lead layer) that applies a current to a lower shield layer and an upper shield layer is generally provided at an inner side than a facing surface of a recording medium.

In a magnetic head device disclosed in JP-A-2001-307307, a portion of each of a lower shield layer and an upper shield layer continuously extends backward, which forms a conductive layer (lead layer). In a magnetic head device disclosed in JP-A-2002-25017, an upper shield layer and a lower shield layer are formed such that the lower shield layer has a larger area than the upper shield layer and a rear portion of the lower shield layer extends backward more than a rear portion of the upper shield layer, via-hole conductors are provided on the lower and upper shield layers, and a conductive layer (lead layer) that is electrically connected to each via-hole conductor is provided on an insulating layer covering the lower shield layer.

The lower shield layer and the upper shield layer have a function of transmitting a magnetic flux from a recording medium, preventing the magnetic flux from leaking into a region other than the detecting element, and restricting a magnetic signal to be read by the detecting element in a linear direction. In recent years, in a recording medium such as a hard disk or the like, a recording density, a reproducing speed of a signal recorded on the recording medium, and a frequency of a reproducing signal have been increased. Therefore, due to a magnetic resistance effect (MR effect) of each of the lower shield layer and the upper shield layer, reading precision of the detecting element may be reduced or noise may overlap reading signals. For this reason, it is preferable that each of the lower shield layer and the upper shield layer have an area as small as possible and a simple shape.

In the magnetic head device disclosed in JP-A-2001-307307, the lower shield layer and the upper shield layer integrally extend backward, thereby forming a conductive layer. As a result, the lower shield layer and the upper shield layer have complicated planar shapes that may cause noise. Further, since each of the lower shield layer and the upper shield layer is formed of a soft magnetic material, such as an alloy of Ni.Fe (alloy of nickel and iron), a direct current resistance is high, and a detection output calculated from the resistance variation may be reduced.

In the magnetic head device disclosed in JP-A-2002-25017, since the lower shield layer is formed to have a larger size than the upper shield layer, it is likely to provide unbalanced shielding effects between the lower shield layer and the upper shield layer, which affects reading precision of the detecting element. Further, noise may occur due to the large and complicated shape of the lower shield layer. Furthermore, via-hole conductors are formed in the lower shield layer and the upper shield layer, and a lead layer that is electrically connected to the lower shield layer and a lead layer that is electrically connected to the upper shield layer are formed at locations higher than the upper shield layer. Thus, the size of the entire magnetic head device is increased.

SUMMARY

A magnetic head device includes a first shield layer and a second shield layer having inner surfaces disposed opposite to each other with a predetermined gap therebetween. The first and second shield layers are formed of a soft magnetic material. A detecting element is disposed between the first shield layer and the second shield layer. When a current is applied to the detecting element in a thicknesswise direction, the first shield layer and the second shield layer form a current path. A first conductive electrode and a second conductive electrode are electrically connected to the first shield layer and the second shield layer, respectively. The second shield layer has end faces extending in a depthwise direction with respect to a surface facing a recording medium, and one of the end faces is disposed farther from the detecting element in a direction parallel to the surface facing the recording medium than an end face of the first shield layer. The second conductive electrode is disposed adjacent to the inner surface of the second shield layer and is not adjacent to the inner surface of the first shield layer.

According to another aspect, a magnetic head device includes a first shield layer and a second shield layer having inner surfaces disposed opposite to each other with a predetermined gap therebetween. The first and second shield layers are formed of a soft magnetic material. A detecting element is disposed between the first shield layer and the second shield layer. When a current is applied to the detecting element in a thicknesswise direction, the first shield layer and the second shield layer form a current path. The first conductive electrode and a second conductive electrode are electrically connected to the first shield layer and the second shield layer, respectively. The second shield layer has end faces extending along a depthwise direction with respect to a surface facing a recording medium, and the end faces extend farther from the surface than end faces of the first shield layer extending along the depthwise direction. The first conductive electrode is disposed at a location adjacent to the inner surface of the first shield layer and not adjacent to the inner surface of the second shield layer. The second conductive electrode is disposed at a location not adjacent to the inner surface of the first shield layer while being adjacent the inner surface of the second shield layer.

In the magnetic head device described herein, even though the facing interval between the first shield layer and the second shield layer is small, the first conductive electrode and the second conductive electrode may be formed at a middle location between the first and second shield layers in a heightwise direction to form a small-sized magnetic head device. Further, each of the first shield layer and the second shield layer may be formed to have a flat and simple shape, which suppresses noise from occurring due to a magnetoresistance effect of the first and second shield layers.

DETAILED DESCRIPTION

Figure 1:
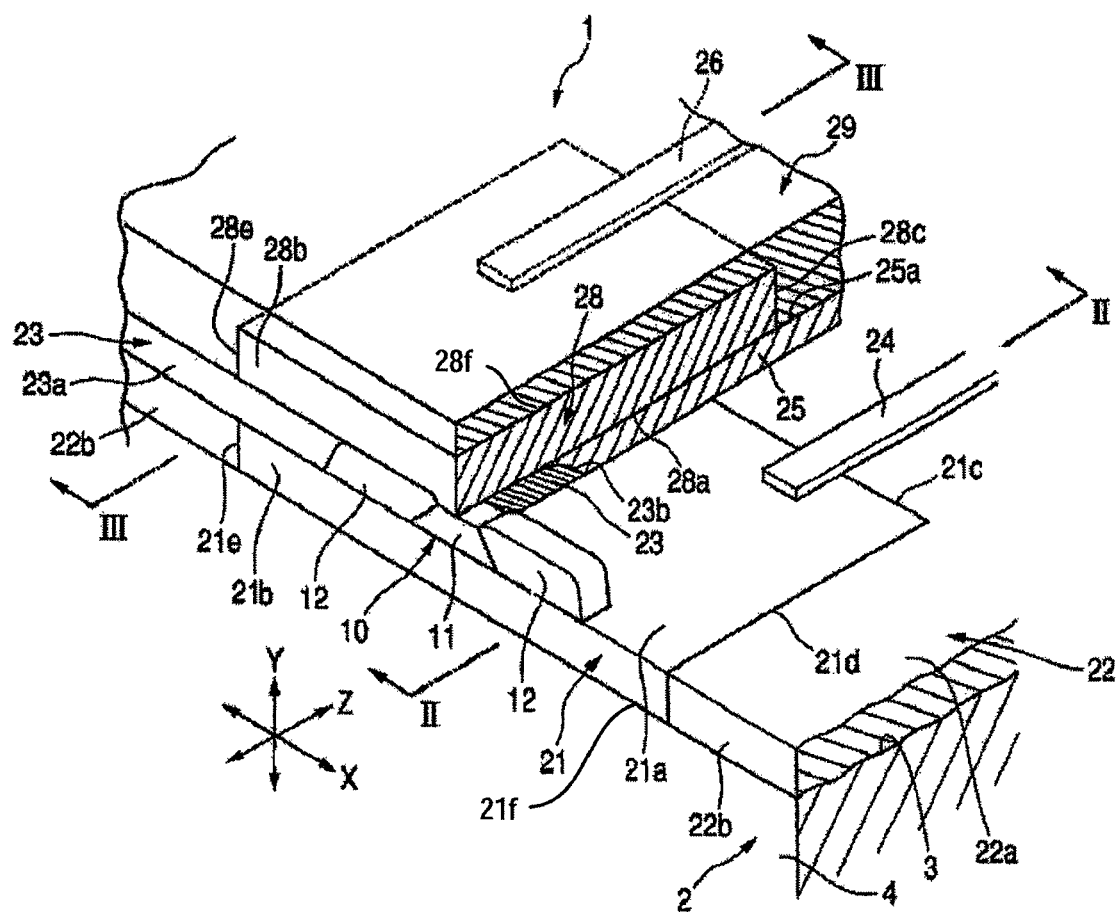
FIG. 1 is a partial sectional perspective view illustrating a magnetic head device according to a first embodiment.
Figure 2:
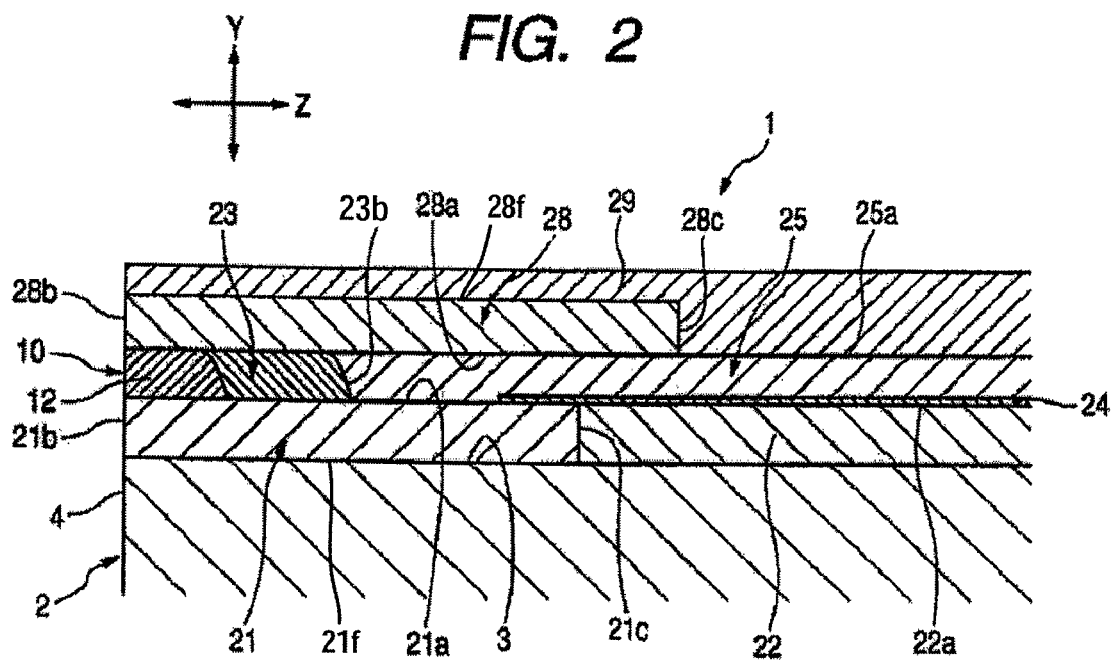
FIG. 2 is a cross-sectional view of a magnetic head device taken along the line II-II of FIG. 1.
Figure 3:
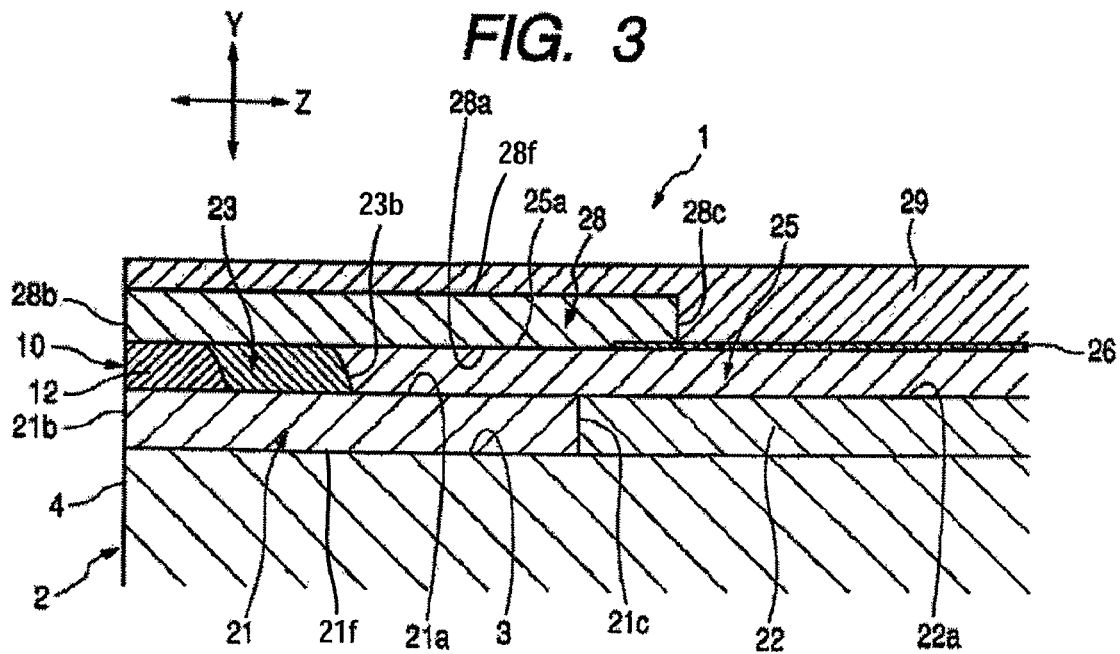
FIG. 3 is a cross-sectional view of a magnetic head device taken along the line III-III of FIG. 1.
Figure 7:
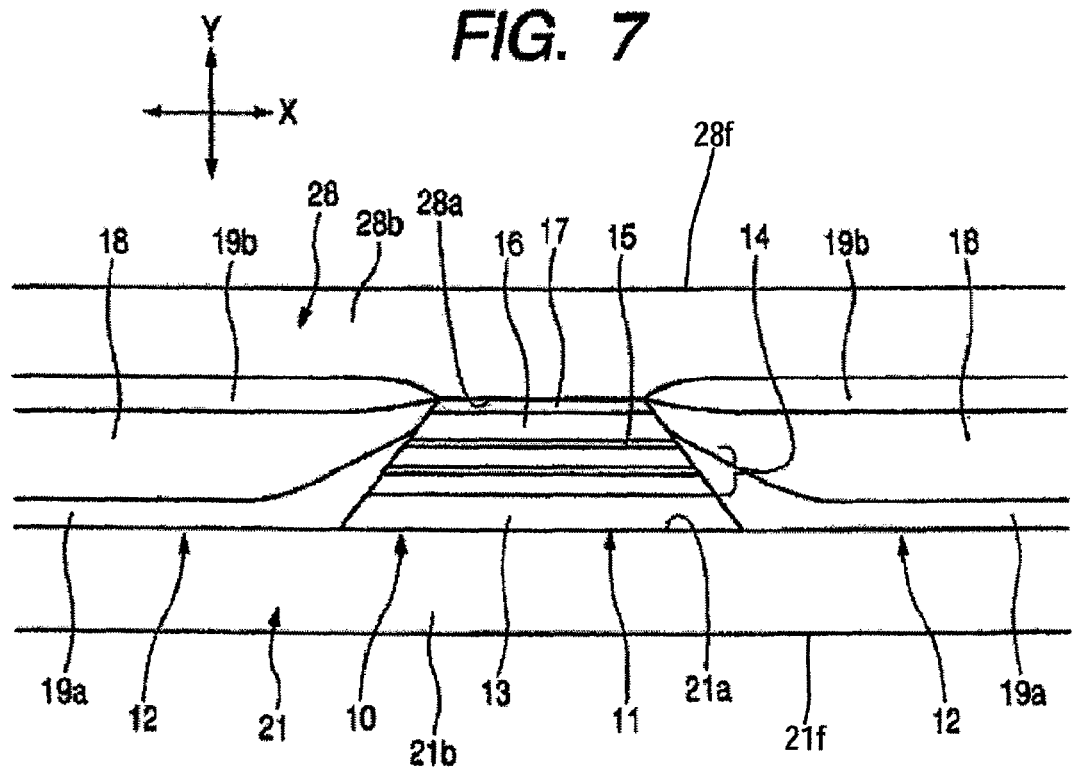
FIG. 7 is a front view of a detecting element, and a lower shield layer and an upper shield layer when viewed from a facing side of a recording medium.

FIG. 1 is a partial sectional perspective view illustrating a magnetic head device according to a first embodiment. FIG. 2 is a cross-sectional view of a magnetic head device taken along the line II-II of FIG. 1. FIG. 3 is a cross-sectional view of a magnetic head device taken along the line III-III of FIG. 1. FIG. 7 is a front view of a detecting element, a lower shield layer and an upper shield layer, when viewed from a facing side of a recording medium.

A magnetic head device 1 is formed on a trailing-side end face 3 of a slider 2 by means of a thin film process. The slider 2 is formed of a ceramic material such as $Al_2O_3$.TiC (alumina and titanium carbide). A facing surface 4 is opposite to a magnetic recording medium, such as a hard disk or the like. In the slider 2, a surface opposite to the facing surface 4 is fixed to an elastically deformable flexure (not shown), and is supported by a front end of a supporter (not shown) called a load beam to be elastically deformable. When a recording medium rotates, the facing surface 4 floats from a surface of the recording medium due to an air flow (airbearing) between the surface of the recording medium and the facing surface 4, and a very small distance is obtained between the magnetic head device 1 and the surface of the recording medium. The leak magnetic flux from a magnetic signal that is recorded on the recording medium is detected by the magnetic head device 1.

In FIGS. 1 to 3, a Y direction is the direction of motion of the recording medium, but is referred to as an upward and downward direction in the following description. Further, an X direction is a track widthwise direction of the magnetic signal recorded on the recording medium, but is referred to as a widthwise direction or a leftward and rightward direction in the below description. Furthermore, a Z direction is a direction in which a leakage magnetic flux from the recording medium flows, but is referred to as a depthwise direction or a forward and backward direction. Further, in the slider 2 for recording and reproducing, a magnetic head device for recording that is formed by a thin film process is formed to overlap a region on the magnetic head device 1, but the magnetic head for recording is not shown in FIG. 1.

A detecting element 10 is provided in the magnetic head device 1. FIG. 7 is a front view of the detecting element 10 when viewed from the Z direction. The detecting element 10 has a detecting unit 11 located at a central portion of the detecting element 10 in a widthwise direction (X direction), and bias units 12 that are respectively located at right and left sides of the detecting element 10.

As shown in FIG. 7, the detecting unit 11 includes an antiferromagnetic material layer 13, a pinned magnetic layer 14, a non-magnetic material layer 15, a free magnetic layer 16, and a protective layer 17, which are formed such that they sequentially overlie one another from a lower side (slider 2 side). Each of the antiferromagnetic material layer 13, the pinned magnetic layer 14, the non-magnetic material layer 15, the free magnetic layer 16, and the protective layer 17 is a thin film having a thickness measured in units of nm (nanometer) or units of Å (angstrom). The antiferromagnetic material layer 13 may be formed of, for example, an alloy of Ir.Mn (an alloy of iridium and manganese or IrMn alloy), or an alloy of Pt.Mn (alloy of platinum and manganese or a PtMn alloy). The pinned magnetic layer 14 has a laminated ferrimagnetic structure in which a lower layer may be made of an alloy of Co.Fe (alloy of cobalt and iron or a CoFe alloy), a middle layer may be made of Ru (ruthenium), and an upper layer may be made of an alloy of Co.Fe (CoFe alloy). The layers of the ferrimagnetic structure overlie one another. Due to exchange-coupling between the antiferromagnetic material layer 13 and the lower layer preferably made of a CoFe alloy that adheres closely to the antiferromagnetic material layer 13, the magnetization direction of the lower layer is pinned in a depthwise direction (z direction). Further, by an RKKY interaction through Ru, the magnetization direction of the upper layer preferably made of the CoFe alloy is fixed in a depthwise direction (Z direction) opposite to the magnetization direction of the lower layer.

When forming a CPP-GMR element making use of a giant magnetoresistance effect, the non-magnetic material layer 15 is a non-magnetic conductive layer, such as Cu (copper), and when forming a TMR element making use of a tunnel effect, the non-magnetic material layer 15 is a non-magnetic conductive layer, such as $Al_2O_3$. The free magnetic layer 16 may be formed of an alloy of Ni.Fe (NiFe alloy) or the like, and the protective layer 17 may be formed of a conductive metallic material, such as Ta or the like.

Each of the bias units 12 includes a hard magnetic material layer 18 that may be made of an alloy of Co.Pt (alloy of cobalt.platinum or CoPt alloy), a non-magnetic insulating layer 19a that is formed on the bottom of the hard magnetic material layer 18 and may be made of $Al_2O_3$ or the like, and a non-magnetic layer 19b that is formed on the hard magnetic material layer 18 and may be made of Ta or the like. By means of a coercive force in the hard magnetic material layer 18, the magnetization of the free magnetic layer 16 forms a single magnetic domain in a widthwise direction (X direction). The magnetization direction of the free magnetic layer 16 varies due to the leakage magnetic field from the recording medium, and an electrical resistance of the detecting unit 11 varies according to the relative relationship between the magnetization direction of the free magnetic layer 16 and a direction of pinned magnetization of the pinned magnetic layer 14. A sensing current is applied to the detecting unit 11 in a thicknesswise direction (Y direction). By detecting the variation in a voltage due to the variation in the sensing current and the electrical resistance, a signal of the leakage magnetic field from the recording medium may be detected.

As shown in FIGS. 1 to 3, according to a structure of the magnetic head device 1 according to the first embodiment, a lower shield layer 21 is provided on a trailing-side end face 3 of the slider 2. The lower shield layer 21 may be formed of a soft magnetic material, such as an alloy of Ni.Fe (NiFe alloy) or an alloy of Co.Fe (CoFe alloy), by using a plating process. Although not shown in the drawing, an insulating layer, which is made of a non-magnetic material, such as $Al_2O_3$, is formed on the trailing-side end face 3 of the slider 2, and a plating base film made of Ni or the like may be formed on the insulating layer by using a sputtering process. On the plating base film, the lower shield layer 21 may be formed by plating a soft magnetic alloy.

In the lower shield layer 21, a top surface is a facing inner surface 21*a*, and a bottom surface that is opposite to the facing inner surface 21*a* is an outer surface 21*f*. The facing inner surface 21*a* and the outer surface 21*f* are flat and are parallel to the trailing-side end face 3 of the slider 2. Further, a thickness of the lower shield layer 21 is substantially uniform over an entire region of the lower shield layer 21. A front side surface 21*b* of the lower shield layer 21 is on the same plane as the facing surface 4 of the slider 2, and an inner side surface 21*c* of the lower shield layer 21 is parallel to the front side surface 21*b*. A right side surface 21*d* and a left side surface 21*e* of the lower shield layer 21 are parallel to each other, and are perpendicular to the inner side surface 21*c* and the front side surface 21*b*. The planar shape of the lower shield layer 21 when viewed from an upper side of a Y direction is rectangular. The detecting element 10 is formed to adhere closely to the top surface 21*a* of the lower shield layer 21, and the lower shield layer 21 and the antiferromagnetic material layer 13 of the detecting unit 11 are electrically connected to each other.

A lower insulating layer 22 is formed at a portion closer to an inner side than the inner end face 21*c* of the lower shield layer 21, closer to a right outer side than the right end face 21*d*, and closer to a left outer side than the left end face 21*e*. The lower insulating layer 22 may be formed of a non-magnetic inorganic material, such as $Al_2O_3$ or $SiO_2$, by using a sputtering process. The top surface 22*a* of the lower insulating layer 22 and the facing inner surface 21*a* of the lower shield layer 21 are formed on the same plane. Further, a front side surface 22*b* of the lower insulating layer 22 is formed on the same plane as the facing surface 4 of the slider 2 and the front side surface 21*b* of the lower shield layer 21. Furthermore, the front side surface 22*b* of the lower insulating layer 22 is formed on the same surface as the facing surface 4 of the slider 2 and the front side surface 21*b* of the lower shield layer 21.

As shown in FIGS. 1, 2, and 3, on an inner side of the detecting unit 11 and the bias units 12 and 12 that form the detecting element 10, a first insulating layer 23 may be formed of a non-magnetic inorganic material, such as $Al_2O_3$ or $SiO_2$, by using a sputtering process. A rear edge portion 23*b* of the first insulating layer 23 extends backward to be closer to an inner side than the detecting element 10. Further, the first insulating layer 23 is formed even in right and left side portions of the detecting element 10, and the front side surface 23*a* of the first insulating layer 23 is formed on the same plane as the facing surface 4 of the slider 2 at right and left sides of the detecting element 10.

As shown in FIGS. 1 and 2, a lower conductive electrode 24 is provided on the lower shield layer 21. The lower conductive electrode 24 is made of a conductive material that has a smaller specific resistance than a soft magnetic material forming the lower shield layer 21. Specifically, the lower conductive electrode 24 is formed of a material, such as Cu (copper), Au (platinum), W (tungsten), or the like. The lower conductive electrode 24 may be formed by using a plating process or a sputtering process. The lower conductive electrode 24 has a predetermined width in a region ranging from the top surface 21*a* of the lower shield layer 21 to the top surface 22*a* of the lower insulating layer 22, and the top surface 21*a* of the lower shield layer 21 and the top surface 22*a* of the lower insulating layer 22 are formed on the same plane. The lower conductive electrode 24 is formed to directly come into contact with the top surface 21*a* of the lower shield layer 21, and extends backward more than the inner side surface 21*c* of the lower shield layer 21.

Behind the first insulating layer 23, a second insulating layer 25 is formed. The second insulating layer 25 may be formed of a non-magnetic inorganic material, such as $Al_2O_3$ or $SiO_2$, by using a sputtering process. Further, the second insulating layer 25 is formed on the top surface 21*a* of the lower shield layer 21 and the top surface 22*a* of the lower insulating layer 22 with a predetermined thickness. The lower conductive electrode 24 that is the first conductive electrode is covered by the second insulating layer 25. Further, the second insulating layer 25 is connected to a rear edge portion 23*b* of the first insulating layer 23. As shown in FIGS. 2 and 3, according to this embodiment, the thickness of the second insulating layer 25 is substantially the same as that of the first insulating layer 23. However, the thickness of the second insulating layer 25 may be larger or smaller than that of the first insulating layer 23.

As shown in FIG. 3, an upper conductive electrode 26 that is the second conductive electrode is formed on the top surface 25*a* of the second insulating layer 25. The upper conductive electrode 26 may be formed of the same material as the lower conductive electrode 24 by using a process of the same kind as the lower conductive electrode 24.

An upper shield layer 28 that is the second shield layer is provided on the top surface 25*a* of the second insulating layer 25. The upper shield layer 28 may be formed of the same soft magnetic material as the lower shield layer 21 by using a plating process. That is, a plating base film made of Ni or the like may be formed by using a sputtering process, and a soft magnetic material may be deposited on the plating base film by plating to form the upper shield layer 28.

The upper shield layer 28 is formed to be parallel to the lower shield layer 21 at a predetermined interval in a Y direction together with the lower shield layer 21. That is, the facing inner surface 28*a* that is a bottom surface of the upper shield layer 28 and an outer surface 28*f* that is a top surface opposite to the facing inner surface 28*a* are parallel to the facing inner surface 21*a* of the lower shield layer 21, and the thickness of the upper shield layer 28 is substantially uniform over an entire region of the upper shield layer 28.

The front side surface 28*b* of the upper shield layer 28 is located on the same plane as the front side surface 21*b* of the lower shield layer 21. At an inner side of the front side surface 21*b*, the facing inner surface 21*a* adheres closely to a protective layer 17 of the detecting unit 11, and the upper shield layer 28 and the detecting unit 11 are electrically connected to each other. The left end face 28*e* and the right end face of the upper shield layer 28 are perpendicular to the front side surface 28b and the inner end face 28c. The upper shield layer 28 may have a planar shape of a rectangle when viewed from an upper side of the Y direction.

The left end face 28e of the upper shield layer 28 and the left end face 21e of the lower shield layer 21 may be at the same location in an X direction, and the right end face of the upper shield layer 28 may be formed at the same location as the right end face 21d of the lower shield layer 21 in an X direction. The inner end face 28c of the upper shield layer 28 is located at an inner side spaced farther away from the facing surface 4 than the inner end face 21c of the lower shield layer 21, and an inner portion of the upper shield layer 28 extends farther inward than the inner end face 21c of the lower shield layer 21. As shown in FIG. 3, a portion of the upper shield layer 28, which extends farther inward than the inner end face 21c of the lower shield layer 21, overlying the upper conductive electrode 26, and the upper shield layer 28 and the upper conductive electrode 26 adhere closely or are directly adjacent to each other so as to be electrically connected to each other.

As shown in FIG. 3, the upper conductive electrode 26 that is the second conductive electrode is formed at a location adjacent to the facing inner surface 28a of the upper shield layer 28 that is the second shield layer, while the upper conductive electrode 26 is formed at a location that does not overlie the facing inner surface 21a of the lower shield layer 21 to be the first shield layer. That is, the upper conductive electrode 26 may not be disposed in a region where the lower shield layer 21 and the upper shield layer 28 face each other. Meanwhile, the lower conductive electrode 24 that is the first conductive electrode may be disposed at a location that overlies the facing inner surface 21a of the lower shield layer 21 and may underlie the facing inner surface 28a of the upper shield layer 28. Further, the lower conductive electrode 24 may be located in a facing region between the lower shield layer 21 and the upper shield layer 28.

Since the upper conductive electrode 26 and the lower shield layer 21 are formed at locations that do not overlie each other, the upper conductive electrode 26 and the lower shield layer 21 are electrically insulated from each other. The second insulating layer 25 is located between the lower conductive electrode 24 and the upper shield layer 28, and the lower conductive electrode 24 and the upper shield layer 28 are electrically insulated from each other with the second insulating layer 25 therebetween.

An upper insulating layer 29 is formed on the upper shield layer 28 and the second insulating layer 25. The upper insulating layer 29 may be formed of the same material as the lower insulating layer 22, the first insulating layer 23, and the second insulating layer 25 by using a process of the same type. Further, a magnetic head device for recording is formed on the upper insulating layer 29 so as to overlap it.

In the magnetic head device 1, a current flows through a path of the lower conductive electrode 24, the lower shield layer 21, the detecting unit 11, the upper shield layer 28, and the upper conductive electrode 26, and in the detecting unit 11, a current flows in a thickness direction thereof (Y direction). The lower conductive electrode 24 and the upper conductive electrode 26 are formed at a middle location between the lower shield layer 21 and the upper shield layer 28. In addition, the lower conductive electrode 24 and the upper conductive electrode 26 extend backward farther than the inner side surface 21c of the lower shield layer 21 and the inner end face 28c of the upper shield layer 28.

Since the lower conductive electrode 24 and the upper conductive electrode 26 extend backward at a location in a heightwise direction between the lower shield layer 21 and the upper shield layer 28, a structure for deforming the lower shield layer 21 and the upper shield layer 28 and extracting a current to the outside does not need to be provided. Accordingly, each of the lower shield layer 21 and the upper shield layer 28 may have a simple shape, such as a rectangular shape, and a flat shape.

Further, it is not required that a bump or the like extends upward from the lower shield layer 21 or the upper shield layer 28 so as to form a current path. Since the current supply path to the lower shield layer 21 and the upper shield layer 28 is not disposed above the upper shield layer 28, when the magnetic head device for recording is formed on the upper insulating layer 29 by using a thin film process, the lower conductive electrode 24 and the upper conductive electrode 26 may not hinder lamination of a magnetic head device for recording. For this reason, it may be unnecessary to adopt a structure in which the lower shield layer 21 and the upper shield layer 28 extend to the inner side (side spaced apart from the facing surface 4), and connect to the conductive electrodes at an inner side of a magnetic head device for recording. Therefore, the inner end face 21c of the lower shield layer 21 and the inner end face 28c of the upper shield layer 28 can be disposed at locations close to the facing surface 4, which reduces the respective areas of the lower shield layer 21 and the upper shield layer 28.

Further, all of the lower shield layer 21 and the upper shield layer 28 may have a rectangular shape. When the lower shield layer 21 and the upper shield layer 28 are viewed from an upper side of the Y direction, the planar shape of the upper shield layer 28 and the planar shape of the lower shield layer 21 may be rectangular and flat. Accordingly, the shapes are not complicated.

Since the lower shield layer 21 and the upper shield layer 28 are formed of a soft magnetic material, such as a NiFe alloy or CoFe alloy, they show a magnetoresistance effect. The lower shield layer 21 and the upper shield layer 28 can be formed as small as possible, and the shapes thereof can be simplified, which suppresses noise from occurring due to magnetoresistance effects of the lower shield layer 21 and the upper shield layer 28. Further, since all of the lower shield layer 21 and the upper shield layer 28 have the small size and the simple shape, when the upper and lower shield layers are formed, it may be possible to avoid a plating defect. Further, it may be possible to effectively achieve a shielding effect of the lower shield layer 21 and the upper shield layer 28.

Further, as shown in FIG. 3, since the upper conductive electrode 26 is disposed at a location that does not overlie the lower shield layer 21, it may be possible to ensure an electrical insulating property between the upper conductive electrode 26 and the lower shield layer 21. Further, since the lower conductive electrode 24 adheres closely to the facing inner surface 21a of the lower shield layer 21, an electrical insulating property between the lower conductive electrode 24 and the upper shield layer 28 may be sufficiently ensured by the second insulating layer 25 that is located between the lower shield layer 21 and the upper shield layer 28.

Accordingly, even though an interval between the facing inner surface 21a of the lower shield layer 21 and the facing inner surface 28a of the upper shield layer 28 in a Y direction is small, an electrical insulating property between the lower conductive electrode 24 and the upper shield layer 28, and an electric insulating property between the lower shield layer 21 and the upper conductive electrode 26 may be ensured. That is, the facing interval between the flat lower shield layer 21 and the flat upper shield layer 28 may be made to be small, such that the lower and upper shield layers 21 and 28 can directly come into contact with a bottom surface and a top surface of a small-sized detecting unit 11. As a result, the magnetic head device 1 may be constructed to have a small size, and an electrical insulating property between the lower and upper shield layers 21 and 28, and the conductive electrodes 24 and 26, may be ensured. Further, since each of the lower and upper shield layers 21 and 28 has a small size and a flat shape, noise generated by the lower and upper shield layers 21 and 28 may be reduced.

Figure 4:
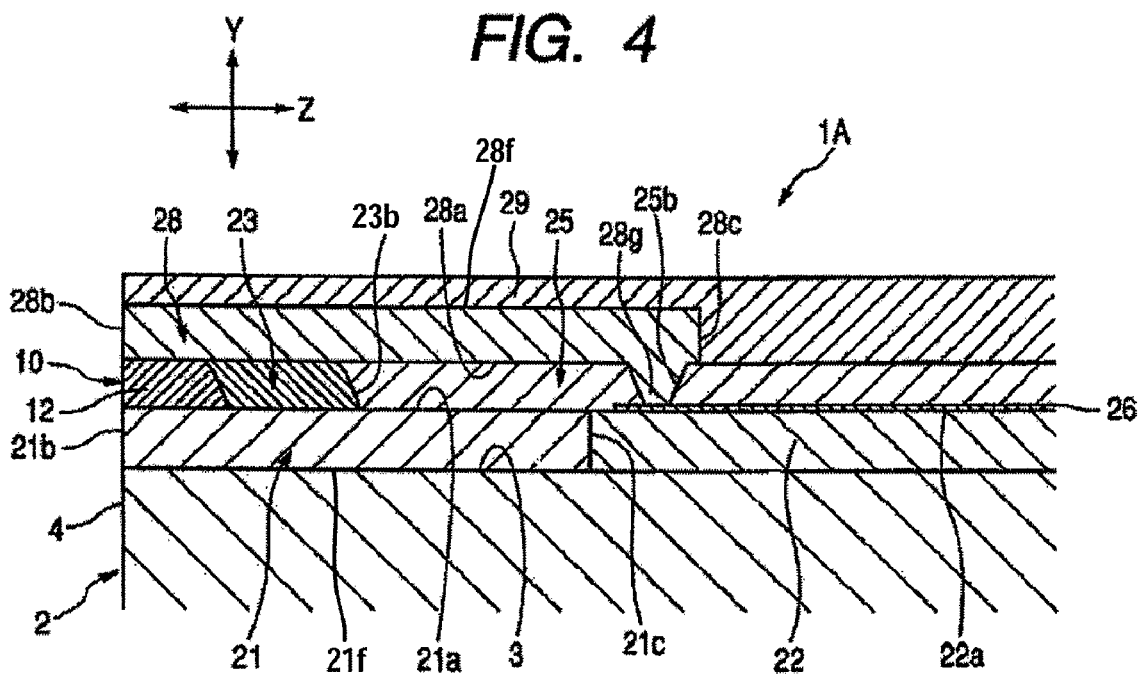
FIG. 4 is a diagram illustrating a magnetic head device according to a modification of a first embodiment, which corresponds to a cross-sectional view of the same portion as FIG. 3.

FIG. 4 is a partial sectional perspective view illustrating a magnetic head device 1A according to a modification of the first embodiment, which corresponds to the cross-sectional view of FIG. 3 (cross-sectional view taken along the line III-III of FIG. 1). The magnetic head device 1A according to the modification shown in FIG. 4 is the same as the magnetic head device 1 according to the first embodiment shown in FIGS. 1 to 3, except for a sectional structure shown in FIG. 4. Therefore, the same constituent elements as those of the magnetic head device 1 according to the first embodiment are denoted by the same reference numerals, and the description thereof will be omitted.

In the magnetic head device 1A, the upper conductive electrode 26 that is the second conductive electrode may be formed at the same location as the lower conductive electrode 24 in a heightwise direction. That is, at a location that does not overlie the facing inner surface 21a of the lower shield layer 21, the upper conductive electrode 26 is formed on the top surface 22a of the lower insulating layer 22. Further, the location of the magnetic head device 1A where the lower conductive electrode 24 is formed is the same as that of the magnetic head device 1A according to the first embodiment. Therefore, the lower conductive electrode 24 and the upper conductive electrode 26 may be disposed at the same location in a heightwise direction, and the lower conductive electrode 24 and the upper conductive electrode 26 may be formed by using the same process at the same time.

As shown in FIG. 4, the upper conductive electrode 26 may be formed at a location that overlies the top surface 22a of the lower insulating layer 22, and the second insulating layer 25 is provided between the upper conductive electrode 26 and the upper shield layer 28. In addition, a defective portion 25b that is a through-hole is formed in a portion of the second insulating layer 25, and a portion of the upper shield layer 28 is inserted into the defective portion 25b, such that the upper conductive electrode 26 and the upper shield layer 28 are electrically connected to each other.

Even in the magnetic head device 1A, since the upper conductive electrode 26 is provided at a location that does not overlie the lower shield layer 21, an electrical insulating property between the upper conductive electrode 26 and the lower shield layer 21 can be ensured. Further, since the lower conductive electrode 24 and the upper conductive electrode 26 can be formed by the same process at the same time, the manufacturing process can be simplified.

In the magnetic head device 1 according to the first embodiment and the magnetic head device 1A according to the modification of the first embodiment, the inner end face 28c of the upper shield layer 28 that is the second shield layer extends closer to the inner side than the inner end face 21c of the lower shield layer 21. However, the left end face 28e of the upper shield layer 28 that is the second shield layer may be formed to extend further in an X direction than the left end face 21e of the lower shield layer 21, and the upper conductive electrode 26 may be formed at a location adjacent to the upper shield layer 28 and extending further in the X direction than the left end face 21e of the lower shield layer 21.

Further, in the magnetic head device 1 according to the first embodiment and the magnetic head device 1A according to the modification of the first embodiment, the lower shield layer 21 is the first shield layer, the upper shield layer 28 is the second shield layer, the lower conductive electrode 24 is the first conductive electrode, and the upper conductive electrode 26 is the second conductive electrode. In contrast, the upper shield layer 28 may be the first shield layer, the lower shield layer 21 may be the second shield layer, the upper conductive electrode 26 may be the first conductive electrode, and the lower conductive electrode 24 may be the second conductive electrode. In this case, the inner end face 21c of the lower shield layer 21 may lie closer to the inner side than the inner end face 28c of the upper shield layer 28, and the lower conductive electrode 24 may be formed at a location not underlying the facing inner surface 28a of the upper shield layer 28 while overlying the facing inner surface 21a of the lower shield layer 21.

Alternatively, the left end face 21e of the lower shield layer 21 may extend farther in an X direction than the left end face 28e of the upper shield layer 28, and the lower conductive electrode 24 may be formed at a location not underlying the upper shield layer 28 while overlapping the lower shield layer 21.

Figure 5:
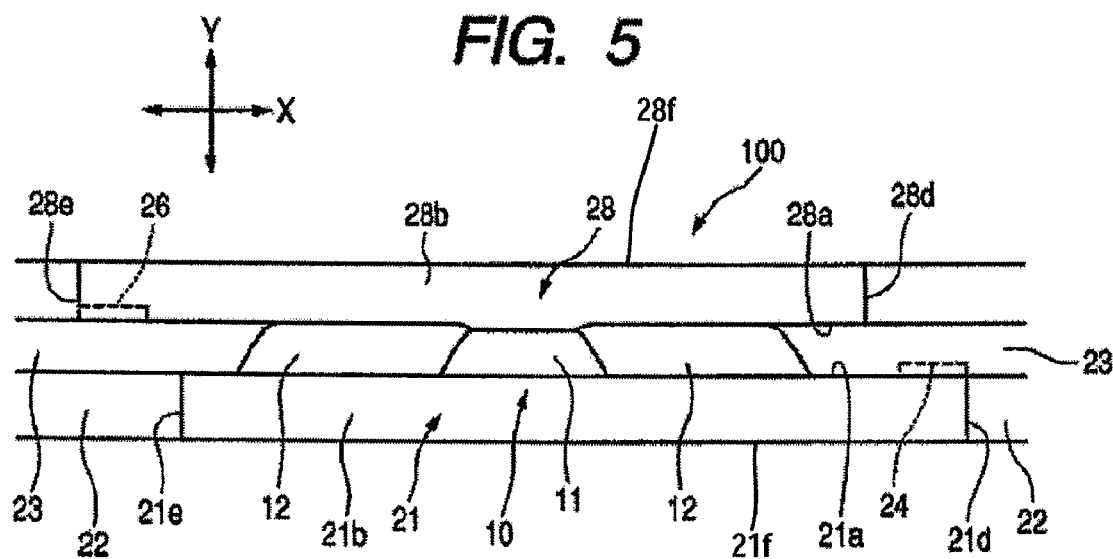
FIG. 5 is a front view of a magnetic head device according to a second embodiment, when viewed from a facing side of a recording medium.
Figure 6:
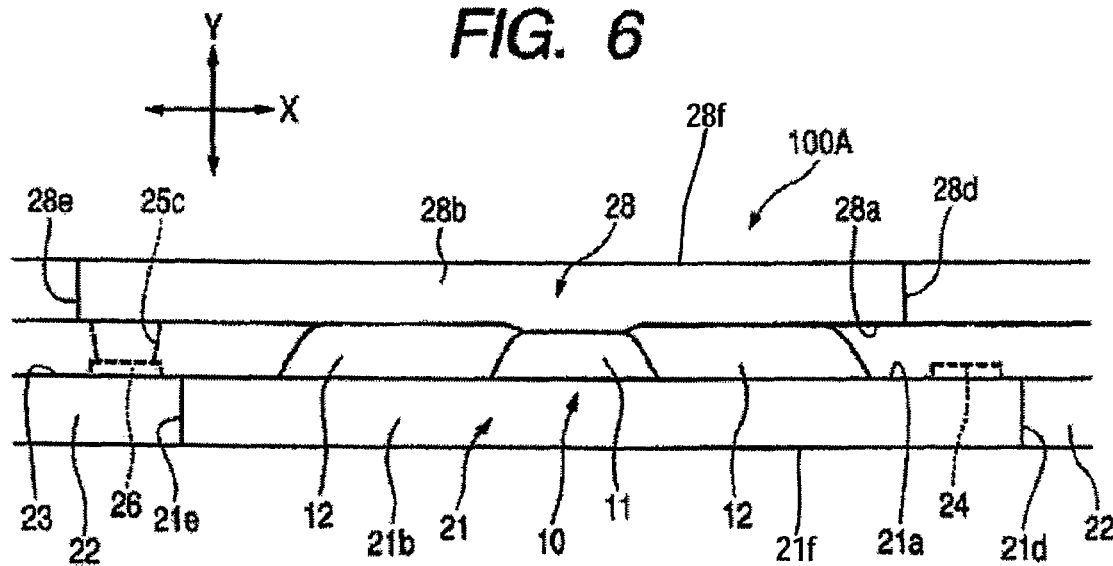
FIG. 6 is a front view of a magnetic head device according to a modification of a second embodiment, when viewed from a facing side of a recording medium.

FIG. 5 is a diagram illustrating a magnetic head device 100 according to a second embodiment. FIG. 6 is a diagram illustrating a magnetic head device 100A according to a modification of the second embodiment. FIGS. 5 and 6 are front views of the magnetic head devices 100 and 100A, when viewed from a facing side of the recording medium (Z side). In FIGS. 5 and 6, the same constituent elements as the magnetic head device 1 according to the first embodiment are denoted by the same reference numerals, and the description thereof will be omitted.

In the magnetic head device 100 according to the second embodiment shown in FIG. 5, the right end face 21d of the lower shield layer 21 that is the first shield layer extends further in the X direction away from the detecting unit 11 than the right end face 28d of the upper shield layer 28 that is the second shield layer, and the left end face 28e of the upper shield layer 28 extends further in the X direction away from the detecting unit 11 than the left end face 21e of the lower shield layer 21. The lower conductive electrode 24 that is the first conductive electrode is formed at a location not underlying the facing inner surface 28a of the upper shield layer 28 while overlying the facing inner surface 21a of the lower shield layer 21. The lower conductive electrode 24 is directly adjacent to and adheres closely to the lower shield layer 21 at a location that is spaced apart from the facing surface 4 of the recording medium toward the inner side. Further, the upper conductive electrode 26 that is the second conductive electrode is formed at a location not overlying the facing inner surface 21a of the lower shield layer 21 while being directly adjacent to the facing inner surface 28a of the upper shield layer 28. The upper conductive electrode 26 and the upper shield layer 28 adhere closely to each other at a location that is spaced apart from the facing surface 4 of the recording medium.

In the magnetic head device 100, one or both of the lower conductive electrode 24 and the upper conductive electrode 26 may not be disposed in a region where the facing inner surface 21a of the lower shield layer 21 and the facing inner surface 28a of the upper shield layer 28 face each other. For this reason, even though the facing interval between the flat lower shield layer 21 and the flat upper shield layer 28 is decreased, an electrical insulating property between the lower conductive electrode 24 and the upper shield layer 28, and an electrical insulating property between the upper conductive electrode 26 and the lower shield layer 21 may be ensured. Therefore, it is possible to construct a magnetic head device having a small-gap structure where the lower shield layer 21 and the upper shield layer 28 are disposed close to each other.

The magnetic head device 100A shown in FIG. 6 is the same as the magnetic head device 100 shown in FIG. 5 in structures of the lower shield layer 21 and the upper shield layer 28. Further, the location of the lower conductive electrode 24 may be the same as that of the magnetic head device 100 shown in FIG. 5. However, according to the modification shown in FIG. 6, the upper conductive electrode 26 is formed at a location that does not overlie the facing inner surface 21a of the lower shield layer 21, and on the top surface 22a of the lower insulating layer 22 at the same location as the lower conductive electrode 24 in a heightwise direction. Further, the defective portion 25c that is the through-hole is formed in the second insulating layer 25, and the a portion of the upper shield layer 28 is located in the defective portion 25c, such that the upper conductive electrode 26 and the upper shield layer 28 are electrically connected to each other through the defective portion 25c.

According to the modification shown in FIG. 6, the lower conductive electrode 24 and the upper conductive electrode 26 can be formed by using the same process at the same time.

The invention claimed is:

1. A magnetic head device comprising:
a first shield layer and a second shield layer having inner surfaces disposed opposite to each other with a predetermined gap therebetween, the first and second shield layers being formed of a soft magnetic material;
a detecting element disposed between the first shield layer and the second shield layer, a current being applied to the detecting element in a thicknesswise direction, the first shield layer and the second shield layer forming a current path; and
a first conductive electrode and a second conductive electrode electrically connected to the first shield layer and the second shield layer, respectively,
wherein the first and second shield layers have end faces extending in a depthwise direction with respect to a surface facing a recording medium, one of the end faces of the second shield layer being disposed farther from the detecting element in a direction parallel to the surface facing the recording medium than an end face of the first shield layer,
the second conductive electrode is disposed adjacent to the inner surface of the second shield layer, the second conductive electrode not being adjacent to the inner surface of the first shield layer,
an insulating layer is provided between the second conductive electrode and the second shield layer, and
the second conductive electrode and the second shield layer being electrically connected to each other through a defective portion formed in the insulating layer.

2. The magnetic head device according to claim 1, wherein the first conductive electrode is provided at a location adjacent to the inner surface of the first shield layer and adjacent to the inner surface of second shield layer, and
the insulating layer is provided between the first conductive electrode and the second shield layer.

3. The magnetic head device according to claim 2, wherein the first conductive electrode is disposed directly adjacent to the inner surface of the first shield layer.

4. The magnetic head device according to claim 1, wherein the end faces of the second shield layer extend farther from the surface facing the recording medium in the depthwise direction than the end faces of the first shield layer.

5. The magnetic head device according to claim 1, wherein the first shield layer is a lower shield layer, and the second shield layer is an upper shield layer.

6. The magnetic head device according to claim 1, wherein the first shield layer is an upper shield layer, and the second shield layer is a lower shield layer.

7. A magnetic head device comprising:
a first shield layer and a second shield layer having inner surfaces disposed opposite to each other with a predetermined gap therebetween, the first and second shield layers being formed of a soft magnetic material;
a detecting element disposed between the first shield layer and the second shield layer, a current being applied to the detecting element in a thicknesswise direction, the first shield layer and the second shield layer forming a current path; and
a first conductive electrode and a second conductive electrode electrically connected to the first shield layer and the second shield layer, respectively,
wherein the first and second shield layers have end faces extending in a depthwise direction with respect to a surface facing a recording medium, one of the end faces of the second shield layer being disposed farther from the detecting element in a direction parallel to the surface facing the recording medium than an end face of the first shield layer,
the second conductive electrode is disposed adjacent to the inner surface of the second shield layer, the second conductive electrode not being adjacent to the inner surface of the first shield layer,
an insulating layer is provided between the second conductive electrode and the second shield layer,
the second conductive electrode and the second shield layer being electrically connected to each other through a defective portion formed in the insulating layer, and
the first conductive electrode and the second conductive electrode are formed on the same plane.

8. A magnetic head device comprising:
a first shield layer and a second shield layer having inner surfaces disposed opposite to each other with a predetermined gap therebetween, the first and second shield layers formed of a soft magnetic material; and
a detecting element disposed between the first shield layer and the second shield layer, a current being applied to the detecting element in a thicknesswise direction, the first shield layer and the second shield layer forming a current path; and
a first conductive electrode and a second conductive electrode electrically connected to the first shield layer and the second shield layer, respectively,
wherein the second shield layer has end faces extending along a depthwise direction with respect to a surface facing a recording medium, the end faces extending farther from the surface than end faces of the first shield layer extending along the depthwise direction, and
the first conductive electrode is disposed at a location not adjacent to the inner surface of the second shield layer while being adjacent to the inner surface of the first shield layer, the second conductive electrode is disposed at a location not adjacent to the inner surface of the first shield layer while being adjacent to the inner surface of the second shield layer, an insulating layer is provided between the second conductive electrode and the second shield layer, and the second conductive electrode and the second shield layer being electrically connected to each other through a defective portion formed in the insulating layer.

9. The magnetic head device according to claim 8, wherein the first conductive electrode is formed directly adjacent to the inner surface of the first shield layer.

10. The magnetic head device according to claim 8, wherein the first conductive electrode and the second conductive electrode are formed on the same plane.

11. The magnetic head device according to claim 8, wherein one of the end faces of the first shield layer is disposed farther from the detection element in a direction parallel to the surface facing the recording medium than one of the end faces of the second shield layer, and the other end face of the second shield layer is disposed farther from the detection element in the other direction parallel to the surface facing the recording medium than the other end face of the first shield layer.

* * * * *